United States Patent
Liu et al.

(10) Patent No.: US 10,185,878 B2
(45) Date of Patent: Jan. 22, 2019

(54) SYSTEM AND METHOD FOR PERSON COUNTING IN IMAGE DATA

(71) Applicant: Microsoft Technology Licensing, LLC, Redmond, WA (US)

(72) Inventors: Zicheng Liu, Bellevue, WA (US); Yinpeng Chen, Sammamish, WA (US); Sean E Anderson, Redmond, WA (US); Zhengyou Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 15/445,416

(22) Filed: Feb. 28, 2017

(65) Prior Publication Data

US 2018/0247132 A1 Aug. 30, 2018

(51) Int. Cl.
*G06K 9/00* (2006.01)
*H04N 5/232* (2006.01)
(Continued)

(52) U.S. Cl.
CPC ..... *G06K 9/00771* (2013.01); *G06K 9/00362* (2013.01); *G06K 9/00624* (2013.01); *G06K 9/00711* (2013.01); *G06K 9/00778* (2013.01); *G06T 11/60* (2013.01); *G08B 13/19602* (2013.01); *G08B 13/19604* (2013.01); *H04N 5/23238* (2013.01); *G06T 2210/12* (2013.01)

(58) Field of Classification Search
CPC .......... G06K 9/00711; G06K 9/00778; G06K 9/00771; G06K 9/00362; G06K 9/00624; G08B 13/19602; G08B 13/19604; H04N 5/23238
See application file for complete search history.

(56) References Cited

U.S. PATENT DOCUMENTS 5,782,766 A * 7/1998 Weng ................ G06T 7/246
128/916
7,277,118 B2 10/2007 Foote
(Continued)

OTHER PUBLICATIONS

"WebCamSplitter", http://web.archive.org/web/20151224131223/http:/very-soft.com/product/webcamsplitter, Published on: Dec. 24, 2015, 6 pages.
(Continued)

*Primary Examiner* — Robert J Hance
(74) *Attorney, Agent, or Firm* — Schwegman Lundberg & Woessner, P.A.

(57) ABSTRACT

Systems and methods for person counting are disclosed. A method may include retrieving an image frame from a plurality of image frames captured by a camera. The image frame may be split into a grid of a plurality of cells of a pre-determined cell dimensions. The pre-determined cell dimensions may be based on dimensions of the retrieved image frame and reference dimensions of training images of a person detection classifier. At least a portion of the plurality of cells may be rearranged to generate a new image. The new image may be padded with at least one padding strip to adjust dimensions of the new image to the reference dimensions of the training images. Person detection may be performed using the new image and the person detection classifier to obtain a number of persons detected within the new image.

20 Claims, 16 Drawing Sheets

(51) Int. Cl.
*G06T 11/60* (2006.01)
*G08B 13/196* (2006.01)

(56) References Cited

U.S. PATENT DOCUMENTS

| | | | |
|---|---|---|---|
| 7,843,495 B2 | 11/2010 | Aas et al. | |
| 8,692,867 B2 * | 4/2014 | Bigioi et al. | |
| 2008/0152257 A1 * | 6/2008 | Ferguson | G06K 9/32 382/281 |
| 2009/0209833 A1 * | 8/2009 | Waagen | G06T 7/0016 600/306 |
| 2011/0069871 A1 | 3/2011 | Tsou | |
| 2011/0075945 A1 * | 3/2011 | Yamaji | G06T 11/60 382/284 |
| 2012/0278904 A1 | 11/2012 | Perez et al. | |
| 2013/0182905 A1 | 7/2013 | Myers et al. | |
| 2014/0078249 A1 * | 3/2014 | Wang | H04N 19/597 348/43 |
| 2014/0152763 A1 | 6/2014 | Lim et al. | |
| 2014/0277757 A1 | 9/2014 | Wang et al. | |
| 2015/0116456 A1 * | 4/2015 | Hatasawa | H04N 5/04 348/43 |

OTHER PUBLICATIONS

Zhang, et al., "PanoContext: A Whole-room 3D Context Model for Panoramic Scene Understanding", In European conference on Computer Vision, Sep. 6, 2014, pp. 1-18.

Yun, et al., "Human Movement Detection and Identification Using Pyroelectric Infrared Sensors", In Journal of Sensors, vol. 14, Issue 5, May 5, 2014, pp. 8057-5081.

"Desk Sensors", http://web.archive.org/web/20160430094941/http://www.peoplecounting.co.uk/space-management/desk-counting/desk-sensors, Published on: Apr. 30, 2016, 4 pages.

Patil, et al., "People Detection and Tracking in High Resolution Panoramic Video Mosaic", In Proceedings of IEEE/RSJ International Conference on Intelligent Robots and Systems, Sep. 28, 2004, pp. 1323-1328.

Ren, et al., "Faster R-CNN: Towards Real-Time Object Detection with Region Proposal Networks", In Journal of IEEE Transactions on Pattern Analysis and Machine Intelligence, Jun. 6, 2016, pp. 1-9.

* cited by examiner

SYSTEM AND METHOD FOR PERSON COUNTING IN IMAGE DATA

BACKGROUND

The deployment of video surveillance systems is becoming increasingly popular. Digital video generated by such video surveillance systems can be used for continuous monitoring of a specific area as well as to segment crowds into individuals for purposes of person identification, tracking or counting. Person identification and counting have also gained popularity within office environments in order to estimate event attendance, office space usage patterns, and so forth. However, video surveillance applications, including person identification and counting applications, utilize dedicated cameras, which can be difficult to install in a large office environment due to space and cost considerations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a system such as a computing device may include a processing unit and a memory storing a plurality of image frames from a video feed of a camera. The system may be configured to perform operations for processing video data, and the operations can include retrieving an image frame from the plurality of image frames. The image frame may be split into a grid of a plurality of cells having pre-determined cell dimensions. The pre-determined cell dimensions may be based on dimensions of the retrieved image frame and reference dimensions of training images of a person detection classifier. At least a portion of the plurality of cells may be rearranged to generate a new image. The new image may be padded with at least one padding strip to adjust dimensions of the new image based on the reference dimensions of the training images. Person detection may be performed using the new image and the person detection classifier to obtain a number of persons detected within the new image.

In accordance with one or more aspects, a method for person counting within an area may be implemented at least in part by a computing device. The method may include retrieving an image frame from a video feed of a panoramic video camera. The image frame may be split into horizontally adjacent patches, where dimensions of each patch are proportional to reference dimensions of training images of a person detection classifier (e.g., a training image compatible with a person detection processor or functionality using one or more person detection techniques or algorithms). The patches may be enlarged horizontally (e.g., a vertical border of the patch may be moved so that the patch is extended) to achieve vertical overlap between neighboring patches. Person detection may be performed using the overlapping patches and the person detection classifier to obtain a total number of persons detected within the area. The total number of persons detected may be adjusted based on redundant detection of persons located within the vertical overlap.

In accordance with one or more aspects, a computer-readable storage medium may store computer-executable instructions for causing a computing device to perform operations for person counting within a viewing area of a camera. The stored instructions can include instructions to retrieve an image frame from a video feed of a panoramic video camera, and split the image frame into horizontally adjacent patches. The dimensions of each patch may be proportional to the reference dimensions of training images of a person detection classifier. The instructions can further include instructions to enlarge the patches horizontally to achieve vertical overlap between neighboring patches, and to detect motion within the viewing area. The instructions can further include instructions to localize the detected motion to a selected one of the enlarged patches, and to perform person detection on the selected patch using the person detection classifier, to obtain a total number of persons detected within the viewing area.

DETAILED DESCRIPTION

Figure 1:
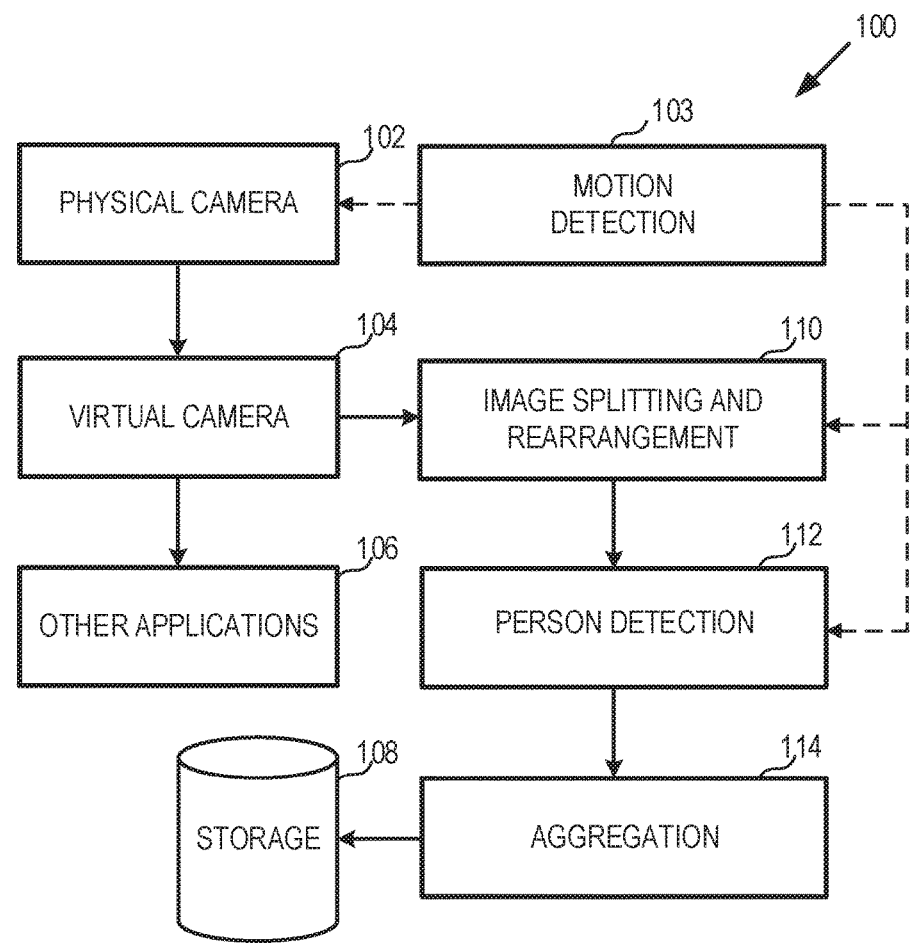
FIG. 1 is a block diagram illustrating a system for person counting, in accordance with an example.

In accordance with techniques described herein, a person counting service can be used for obtaining occupancy information in, for example, meeting rooms or open workspace. It can be useful for an enterprise to know how the office space, such as meeting rooms and "hot desks", are used. For example, if a large meeting room is often used by 3-4 people, this large meeting room could be divided into multiple smaller meeting rooms or converted to offices. In this regard, the occupancy information can help the enterprise executives to make informative decisions on the office space planning and restructuring, thereby reducing cost and improving productivity.

Some approaches for crowd monitoring solutions use cameras such as to count the number of people in a store, at an entrance of a building, or at other public places, but there are challenges specific to office spaces which previous crowd monitoring and person counting solutions do not address. For instance, in a meeting/conference room, an installed camera is primarily used for video conferencing. Because video data from a camera device is typically streamed to a single application, conventional person counting solutions would involve the installation of a second (dedicated) camera to obtain a second stream of video data, which increases the equipment and installation cost. In accordance with techniques described herein, a virtual camera can be used that allows multiple applications to simultaneously access the images captured by a single physical camera.

In an example, a person detector can be trained and operated using convolutional neural network techniques and can be configured to scale the input images to fixed pixel dimensions (e.g., a resolution of 640×480 pixels), such as a set of pixel dimensions of a training image that serve as "reference dimensions". For a meeting room with a panoramic camera, the accuracy of person detection can be poor when the panoramic image is input directly into the person detector because the panoramic image is much wider than the conventional camera training image the person detectors are usually trained on. In accordance with techniques described herein, a panoramic image obtained from, for example, a conference room panoramic camera, can be split into two or more sections (e.g., patches) and rearranged before communicating it to a person detector classifier. In an example, a person detector classifier includes suitable circuitry, interfaces, or code configured to perform person detection according to one or more person detection techniques or algorithms.

In another example, a large open space area may utilize a camera with a high resolution (e.g., pixel dimensions exceeding 480 horizontal lines) and a large field of view (e.g., the number of vertical lines of pixels exceeding 2 times the number of horizontal lines of pixels). A high resolution image may be supplied to the person detector classifier for processing. However, using a high resolution image by the person detection classifier may result in reduced detection accuracy as the high resolution image is scaled down to a low resolution image (e.g., 640×480 pixels) compatible with the reference dimensions of the training image(s) used by the person detection classifier. In accordance with techniques described herein, a higher resolution image can be divided into multiple lower resolution patches (e.g., overlapping patches), and each patch (or group of patches) can be communicated to the person detector classifier. After person detection is performed, any redundant or erroneous detections (e.g., redundant or duplicate detections in an overlapped region) can be removed.

The techniques described herein can be implemented in the general context of computer-executable instructions, such as those included in software-implemented programs, being executed in a computing system on a target real or virtual processor. As an example, such programs may include routines, libraries, objects, classes, components, data structures, etc. that perform particular tasks or implement particular data types. The functionality of the programs may be combined or split between program units as desired in various embodiments. Computer-executable instructions for programs may be executed within a local or distributed computing system. Additionally, the techniques described herein can be implemented in the context of a system, a device, an apparatus, or a like machine. In general, a computing system or computing device can be local or distributed, and can include any combination of special-purpose hardware and/or general-purpose hardware with software implementing the functionality described herein.

FIG. 1 is a block diagram illustrating a system 100 for person counting, in accordance with an example. Referring to FIG. 1, the person counting system 100 may include a camera 102 providing input to a virtual camera 104, image splitting and rearrangement functionality 110, and a person detection functionality 112, where each may include suitable circuitry, logic, interfaces and/or code. The camera 102 can include a panoramic video camera, a high-resolution video camera or any other type of camera used in connection with, e.g., video conferencing functionalities. In an example, the video feed of the camera 102 may be provided to a virtual camera 104, which can include suitable circuitry, logic, interfaces and/or code configured to split the video feed so that it can be used simultaneously by other applications 106 as well as the image splitting and rearrangement functionality 110. In an example, the splitting of the video feed by the virtual camera 104 may be dynamic to allow one or more of the applications 106 to start and stop at random times. In instances when an application starts, the virtual camera 104 may create a new stream for the application. In instances when an application stops, the virtual camera may stop supplying the video feed.

Figure 3:
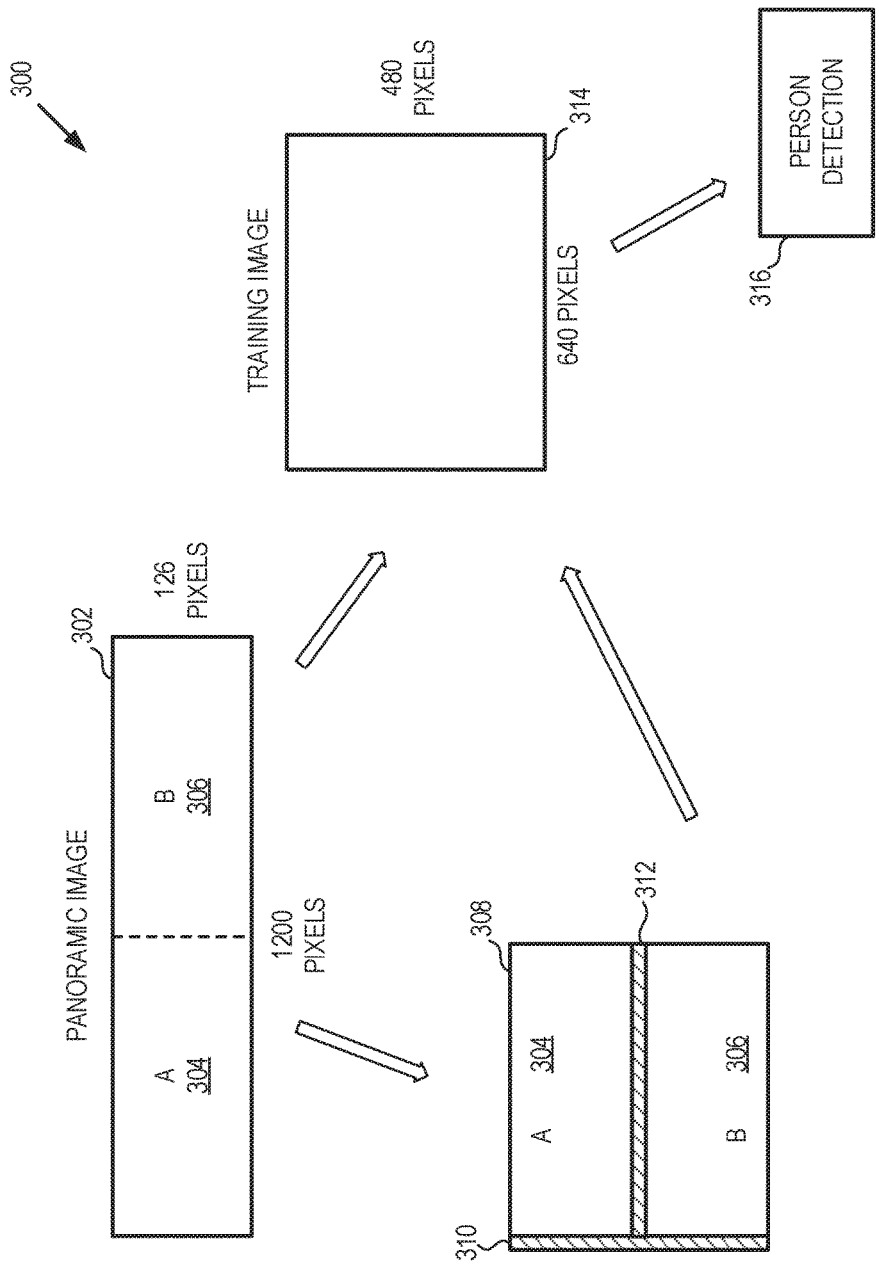
FIG. 3 is a diagram illustrating person detection using a panoramic image, in accordance with an example.
Figure 4A:
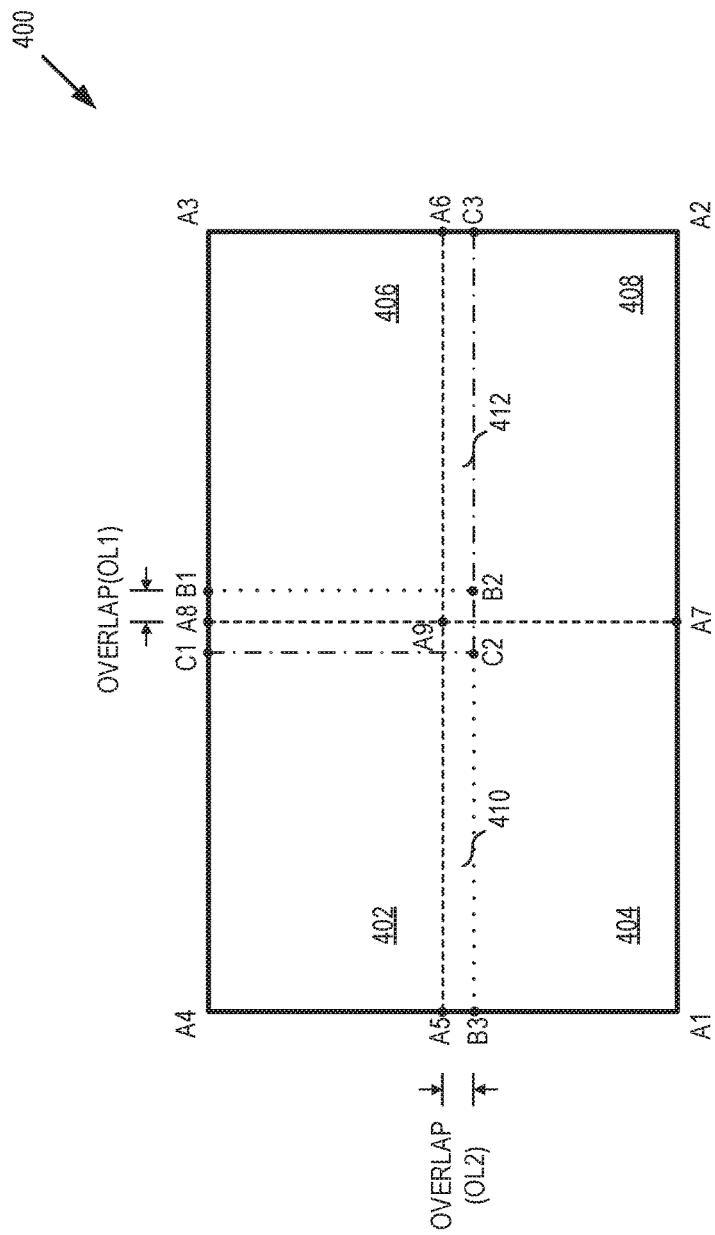
FIGS. 4A-4B illustrate processing of a high-resolution image for person counting, in accordance with an example.
Figure 4B:
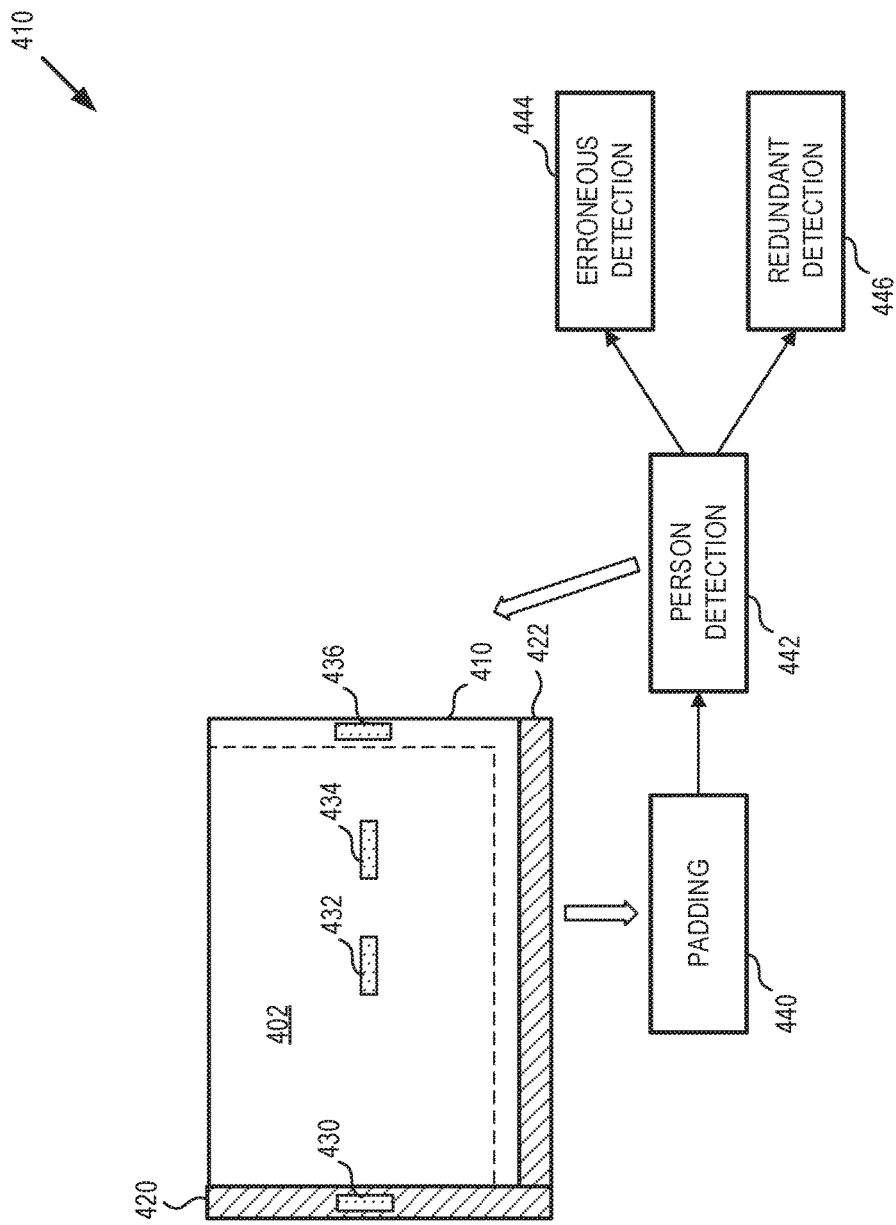

The image splitting and rearrangement functionality 110 may include suitable circuitry, logic, interfaces and/or code, and can be configured to perform image splitting and rearrangement (e.g., as illustrated in reference to FIGS. 3-4B). The person detection functionality 112 may include suitable circuitry, logic, interfaces and/or code and can be configured to perform person detection operations. For example, the person detection functionality 112 may perform person detection on one or more images provided by the image splitting and rearrangement functionality 110. The person counting data output by the person detection functionality 112 may be aggregated by the aggregation functionality 114. In an example, the aggregation functionality 114 may be configured to perform occupancy statistical analysis using the person counting data received from the person detection functionality 112. The person counting data as well as the occupancy statistical analysis (e.g., patterns) data may be stored in storage 108, which in an example may include remote/cloud storage.

In an example, the motion detection functionality 103 may be used to detect motion within an area where the camera 102 is located, so that the image splitting and rearrangement functionalities and/or the person detection functionalities may be activated upon detecting the motion.

Figure 2:
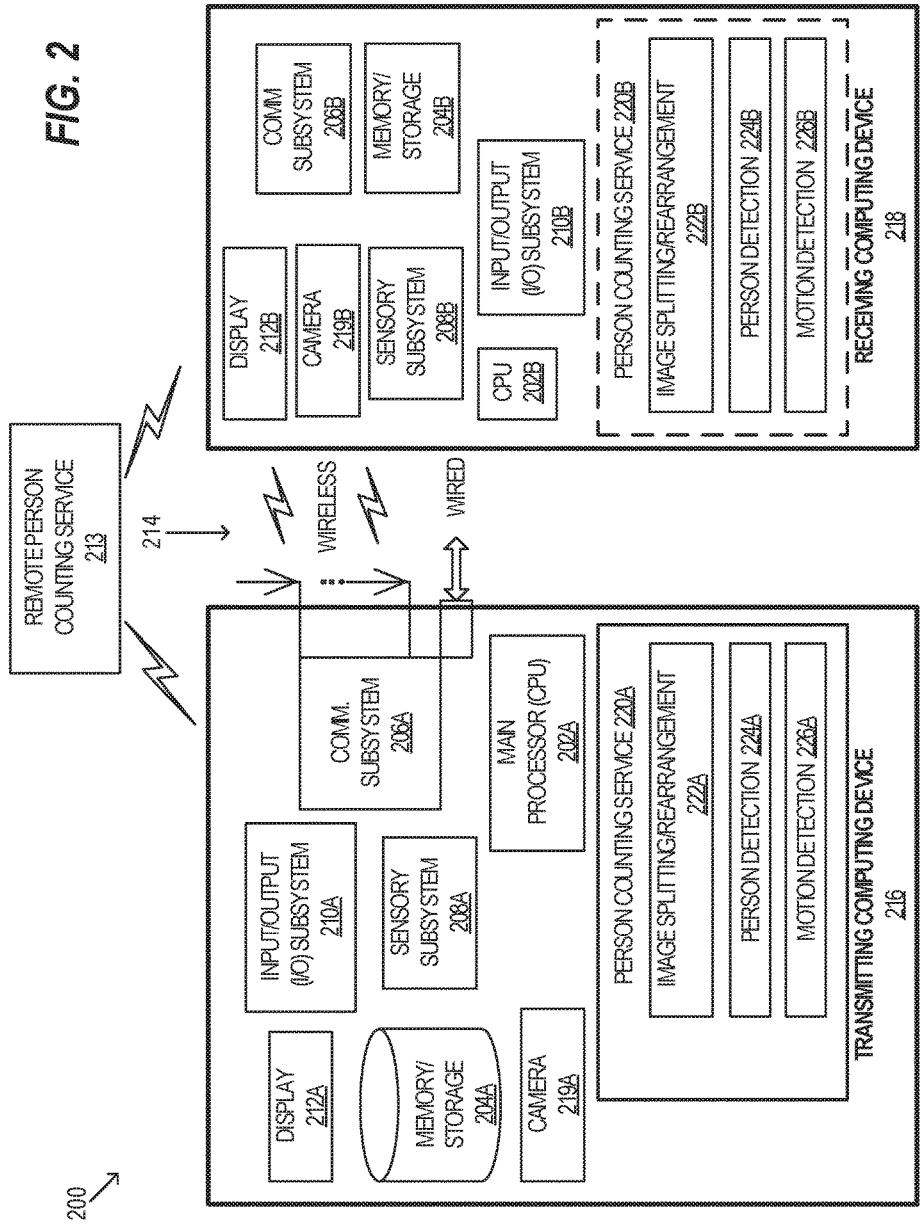
FIG. 2 is a block diagram of an example architecture with transmitting and receiving devices implementing person counting functionalities, in accordance with an example.

In an example, the person counting system 100 can be implemented within a single camera-enabled device as a person counting service, including the image splitting and rearrangement functionality 110, the person detection functionality 112 and the motion detection functionality 103 (e.g., as illustrated in FIG. 2). In an example, one or more of the functionalities provided by the person counting system 100 can be distributed among multiple devices communicatively coupled to each other (e.g., one or more devices in a cloud, providing person counting functionalities as a service).

FIG. 2 is a block diagram of example architecture with transmitting and receiving devices implementing person counting functionalities, in accordance with art example embodiment. Referring to FIG. 2, the example architecture 200 may include a transmitting computing device 216, a receiving computing device 218, and the remote person counting service 213.

The computing devices 216 and 218 may each include a handset, a smartphone, a tablet, a laptop, and/or another handheld or portable device. Additionally, the computing devices 216 and 218 may each include, for example, a main processor 202 (202A in device 216 and 202B in device 218), a system memory and/or storage 204 (204A and 204B, respectively), a communication subsystem 206 (206A and 206B, respectively), a sensory subsystem 208 (208A and 208B, respectively), an input/output (I/O) subsystem 210 (210A and 210B, respectively), and a display 212 (212A and 212B, respectively).

The main processor 202A/202B may include suitable logic, circuitry, interfaces, and/or code that may be operable to process data, and/or control and/or manage operations of the computing devices 216/218, and/or tasks and/or applications performed therein in connection with person counting functionalities described herein. In this regard, the main processor 20:2 (202A/202B) may be operable to configure and/or control operations of various components and/or subsystems of the computing devices (216 and 218, respectively), by utilizing, for example, one or more control signals. The main processor 202 enables running and/or execution of applications, programs and/or code, which may be stored, for example, in the memory 204 (204A/204B). In some instances, one or more of the applications running and/or executing on the computing devices (216 and 218, respectively) may generate and/or update video content that may be rendered via the displays 212 (212A/212B).

The memory 204 may include suitable circuitry, interfaces, and/or code that may enable permanent and/or non-permanent storage, buffering, and/or fetching of data, code and/or other information, which may be used, consumed, and/or processed. In this regard, the memory 204 may include different memory technologies, including, for example, read-only memory (ROM), random access memory (RAM), Flash memory, solid-state drive (SSD), field-programmable gate array (FPGA), and/or other types of memory or storage devices. The memory 204 may store, for example, configuration data, which may include parameters and/or code, comprising software and/or firmware. The memory 204 (204A and/or 204B) may also store/buffer one or more image frames from a device camera, in connection with person counting functionalities described herein.

The communication subsystem 206 (206A/206B) may include suitable logic, circuitry, interfaces, and/or code operable to communicate data from and/or to the computing device, such as via one or more wired and/or wireless connections 214. The communication subsystem 206 may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, Wi-Fi, Bluetooth, and/or any other available wireless protocol/interface), facilitating transmission and/or reception of signals to and/or from the computing devices 216/218, and/or processing of transmitted or received signals in accordance with applicable wired or wireless protocols. In this regard, signal processing operations may include filtering, amplification, analog-to-digital conversion and/or digital-to-analog conversion, up-conversion/down-conversion of baseband signals, encoding/decoding, encryption/decryption, and/or modulation/demodulation. In accordance with an embodiment of the disclosure, the communication subsystem 206 may provide wired and/or wireless connections to, for example, the remote person counting service 213 via the wired and/or wireless connections 214.

The sensory subsystems 208 (208A/208B) may each include suitable logic, circuitry, interfaces, and/or code for obtaining and/or generating sensory information, which may relate to the corresponding computing device (216/218), its user(s), and/or its environment. For example, the sensory subsystems 208 may each include positional or locational sensors (e.g., GPS or other GNSS based sensors), ambient conditions (e.g., temperature, humidity, or light) sensors, and/or motion related sensors (e.g., accelerometer, gyroscope, pedometers, motion detector, and/or altimeters).

The I/O subsystems 210 (210A/210B) may include suitable logic, circuitry, interfaces, and/or code for enabling user interactions with the corresponding computing device (116/118), enabling obtaining input from user(s) and/or to providing output to the user(s). The I/O subsystems 210 may each support various types of inputs and/or outputs, including, for example, video, audio, and/or textual. In this regard, dedicated I/O devices and/or components, external to or integrated within the computing devices (216/218), may be utilized for inputting and/or outputting data during operations of the I/O subsystems 210. Example I/O devices may include one or more built-in cameras, such as cameras 219A/219B (e.g., a front-facing and/or rear-facing camera, panoramic camera or other type of high-resolution camera), one or more displays, mice, keyboards, touchscreens, voice input interfaces, and other input/output interfaces or devices. With respect to video outputs, the I/O subsystems 210 may each be operable to generate and/or process video content, graphics, and/or textual data, and/or generate video frames based thereon for display, via the displays 212 for example.

The displays 212A/212B may include suitable logic, circuitry, interfaces and/or code that may enable displaying of video content, which may be handled and/or processed via the I/O subsystems 210A/210B, respectively. The displays 212A/212B may be used in outputting video data in connection with person counting functionalities.

In accordance with an example embodiment of the disclosure, the transmitting computing device 216 may also include a person counting service 220A, which may be operable to perform one or more still image and/or video data processing functionalities described herein in connection with person counting. The person counting service 220A may include image splitting and rearrangement functionality 222A, person detection functionality 224A, and motion detection functionality 226A, which can implement functionalities similar to the corresponding functionalities 110, 112, and 103, respectively, described in connection to FIG. 1.

In accordance with an example embodiment of the disclosure, one or more of the functionalities performed by the person counting service 220A may be implemented (and performed by) the receiving computing device 218 (as reflected in FIG. 2). For example, the receiving computing device 218 may also include a person counting service 220B, with image splitting and rearrangement functionality 222B, person detection functionality 224B, and/or a motion detection functionality 226B. The transmitting computing device 216 can offload processing functions and use the receiving computing device 218 to perform one or more of the operations associated with functionalities 222B, 224B, and/or 226B. In an example, one or more of the person counting service functionalities described herein may also be offloaded and performed by the remote person counting service 213, which may include similar functionality as the person counting services 220A and 220B.

FIG. 3 is a diagram illustrating person detection using a panoramic image, in accordance with an example embodiment. Referring to FIG. 3, the processing sequence 300 may be performed by a person counting service, such as 220A. More specifically, the image splitting and rearrangement functionality 222A may retrieve a panoramic image frame 302. The panoramic image frame 302 may be part of a video feed received from camera 219A and may be retrieved from, 1 hr example, storage 204A. In an example, the panoramic image 302 may have a size (e.g., dimensions) of 1200×126 pixels, but other panoramic image sizes may also be used. Image 314 may be provided from an example training image with a size (e.g., reference dimensions) of 640×480 pixels, used for person detection by the person detection functionality 316 (which can be the same as functionality 224A). Other training image sizes are also possible, based on the person detection classifier used by the person detection functionality 316. In a further example, the panoramic image 302 may be scaled to the reference dimensions of the training image 314, but this may result in erroneous person detection because the panoramic image 302 is almost twice as wide as the training image 314. In a further example, a classifier is built from training images of various sizes, with such training images being scaled to the same "reference" size or dimensions.

In an example, the image splitting and rearrangement functionality 222A may split the image 302 into image portions (or patches) A (304) and B (306), and rearrange the patches to obtain a new image 308. In this regard, the new image 308 will have a size (e.g. dimensions) of 600×352 pixels, which is closer to the size of the training image (640×480 pixels) than the size of the original panoramic image 302. In an example, the image splitting and rearrangement functionality 222A may add one or more padding strips (e.g., horizontal padding strip 312 and/or vertical padding strip 310) in order to adjust the size of the image 308 to the size of the training image 314, while still preserving the image data in the image resolution of the original panoramic image 302, without scaling (e.g., expanding or contracting) the image data.

In an example, the image splitting and rearrangement functionality 222A may split the panoramic image 302 in more than two patches, based on the size (e.g., reference dimensions) of the training image used by the person detection functionality 224A. More specifically, the image splitting and rearrangement functionality 222A may split the original image into a minimal number of patches so that a rearrangement of two or more patches into a single image results in an image size that is proportional to (or approximate to) the training image size (e.g., the width and height in pixels or like elements of the resulting image is within a pre-determined delta from the width and height of the training image). In instances when the new image generated by rearranging the original image patches is approximate to, but not the same size as, the training image, then one or more padding strips (e.g., 310,312) may be added. After the new image 308 is adjusted to the dimensions of the training image 314, then the new image may be communicated to the person detection functionality 316 for person detection.

FIGS. 4A-4B illustrate processing of a high-resolution image for person counting, in accordance with an example embodiment. Referring to FIG. 4A, there is illustrated a high-resolution image 400, which may be obtained from a video feed generated by the camera 102 (or 219). The image 400 may be retrieved from storage (e.g., 108 or 204) or it may be obtained from a real-time camera feed. In comparison to the training image 314, the high-resolution image 400 may be two or more times larger in width and in height and, therefore, splitting the image into horizontally adjacent patches (as done with the panoramic image 302) may generate patches that are too large in comparison to the person detector classifier training image 314.

In an example, the image splitting and rearrangement functionality 222A may split the high-resolution image into a grid of patches (or cells), and re-arrange the cells into one or more new images. The new images may be communicated to the person detector for subsequent processing.

In an example, $W_0$, $H_0$ may denote the training image 314 width and height, respectively. Given any high-resolution image with width w, and height h, values may be denoted as $$x = \text{ceil}\left(\frac{W}{W_0}\right) \text{ and } y = \text{ceil}\left(\frac{H}{H_0}\right).$$

Additionally, values may be denoted as $$W_1 = \text{floor}\left(\frac{W}{x}\right) \text{ and } H_1 = \text{floor}\left(\frac{H}{h}\right),$$

where $W_1 \leq W_0$, $H_1 \leq H_0$. The high-resolution image may be divided into a grid, where each cell has size $W_1 \times H_1$.

In instances when $x \geq 2$, each cell may be enlarged horizontally so that it has an overlap with its neighboring cells. A vertical enlargement and overlap may be performed when $y \geq 2$. In an example, the overlap size may be selected to be $p=0.1*0.5*(W_0+H_0)$.

The size of the grid may be designated as m by n cells, where $$m = \text{floor}\left(\frac{W_0}{W_1}\right) \text{ and } n = \text{floor}\left(\frac{H_0}{H_1}\right).$$

For every group of ten cells, a new image may be formed by rearranging the cells into a grid with n cells in vertical direction, and in cells along horizontal direction. Multiple new images may be formed in this manner (where each cell may be used once) until all the cells are used. Each new image may be communicated to the person detector for detection and subsequent processing (e.g., person count adjustment based on erroneous or duplicative detection).

In an example, for each newly formed image that includes more than one black padding strips may be added along the grid line borders. The width (p) of the padding strips may be proportional to $0.5*(W_0+H_0)$. The padding strips may also be added (or the patch may be further enlarged) in instances when a single patch (or cell) is communicated to the person detection functionality 442 and the size of the patch may need to be adjusted so it is closer to (or the same as) the size of the detector training image. In an example, the width of the padding strips may be selected to be $p=0.1*0.5*(W_0+H_0)$. The final size (e.g., dimensions) of the newly formed image may be determined as $(m*(W_1+p))\times(n*(H_1+p))$.

In an example, the image 400 may be initially split into four patches—402 (with boundaries between points A4, A5, A9, and A8), 404 (with boundaries between points A5, A1, A7, and A9), 406 (with boundaries between points A9, A6, A3, and A8), and 408 (with boundaries between points A7, A2, A6, and A9). In instances when width and height of the patches is equal to (or is within a pre-determined difference from) width and height of the training image 314, then each patch may be individually processed by the person detection functionality (224A or 316). In instances when size of the patches is smaller than the size of the training image, two or more of the patches may be combined to form a single image.

In an example, when a size of each patch is smaller than the reference dimensions of the training images, each patch may be extended horizontally (e.g., by an overlap amount OL1) and/or vertically (by an overlap amount OL2), as seen in FIG. 4A. More specifically, patch 402 may be extended by OL1 and OL2 and be bound between points A4, B3, B2, and B1. Similarly, patch 406 may be extended so that it is bound by C1, C2, C3, and A3. Similar patch extensions may be performed on patches 404 and 408 (not illustrated in FIG. 4A). In an example, the overlap portions OL1 and OL2 may be equal, and may be determined based on the techniques described herein above. Also in an example, even when the patch size is equal to the reference dimensions of the training images, the patches may be extended to have overlap. In a further example, if the patch after extension is slightly larger than the reference dimensions of the training image, then the patch can be scaled to the reference dimensions. In such scenarios, the use of scaling is unlikely to affect the person detection accuracy because scaling amount is very small.

An enlarged patch (e.g., with boundaries between points A4, B3, B2, B1) is referenced as 410 in FIG. 4B (with the added overlap portions indicated by various forms of dashed lines). In an example, the enlarged patch may be further processed by the padding functionality 440 (which may be part of the image splitting and rearrangement functionality) to add one or more padding strips (e.g., 420, 422) along a vertical or horizontal side. The addition of the padding strips may be performed to further adjust the size of the enhanced image 410 to be close to or match the size of the training image 314 used for person detection. In other examples, the padding strips may be added to enhance a border region between the image 410 and another image added together with it to form a single image for processing the person detection functionality 442.

After padding is performed by the padding functionality 440, the padded image is communicated to the person detection functionality 442 for processing. The person detection functionality 442 can provide as output the number of detected persons as well as generate a hounding box around each detected person. Example hounding boxes 430-436 are illustrated in FIG. 4B. The erroneous detection functionality 444 and the redundant detection functionality 446 may each include suitable circuitry, logic, interfaces and/or code and may be configured to perform erroneous and redundant detection, respectively, after generation of the bounding boxes by the person detection functionality 442. The erroneous detection functionality 444 and the redundant detection functionality 446 may be part of the person detection functionality (e.g., 112 or 224A) or the image splitting and rearrangement functionality (e.g., 110 or 222A). The erroneous detection functionality 444 may be configured to detect one or more bounding boxes (e.g., 430), which are entirely located within a padding strip, and remove such bounding box from the detected person count as an erroneous detection. The redundant detection functionality 446 may be configured to detect a hounding box (e.g., 436) within an overlap region, and remove such bounding box from the detected person count as redundant detection, when the bounding box in the overlap region overlaps by a pre-determined amount (e.g., 50%) with another bounding box in the same overlap region.

Figure 5:
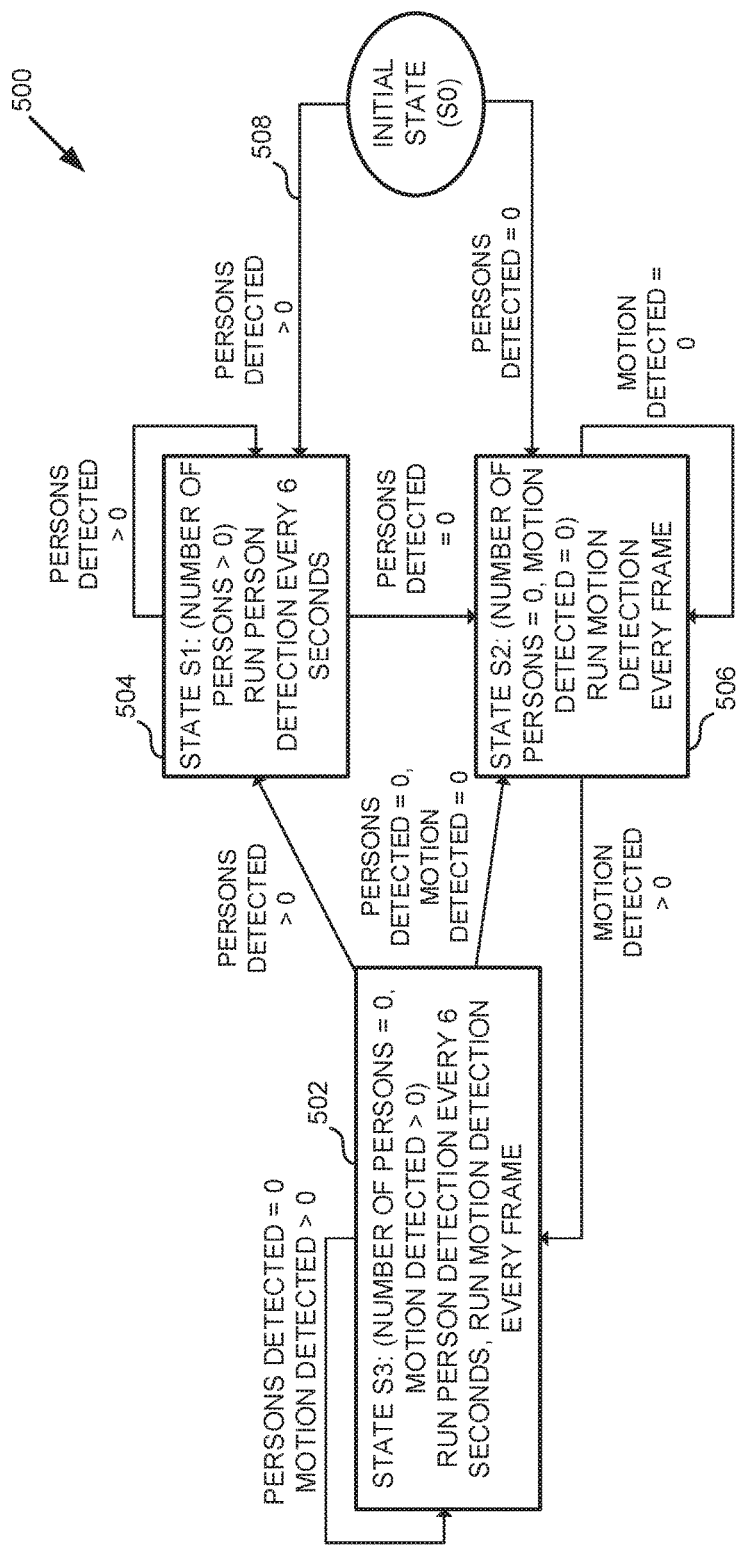
FIG. 5 is a diagram of a state machine, which may be used in connection with person counting operations, in accordance with an example.

FIG. 5 is a diagram of a state machine 500, which may be used in connection with person counting. In an example, a motion detector may be used in connection with the person counting service 220A to, e.g., reduce the computation load of the person detection functionality 224A. For example, the person detection functionality 224 may use the state machine 500, based on four states—S0, S1, S2, and S3. State S0 is the initial state. State S1 indicates the state where there are people in the room (e.g., a number N of persons detected is greater than 0). Person detection operations may be run periodically (e.g., every 6 seconds).

State S2 indicates the state where there is no one in the room and there is no motion (e.g., a motion detection value=0, and the number N of persons detected in the room=0). Motion detection may be run periodically (e.g., every frame), without invoking any person detection, which can improve the energy efficiency of the person counting service 220A. Once motion is detected, state S3 may be invoked where person detection operations are performed periodically.

State S3 indicates the state where no persons are in the room but there is motion detected (e.g., motion detected from lighting changes, trees moving in the background, etc., resulting in a motion detection value >0 and a number N of detected persons=0). In this state, person detection and motion detection operations may be run periodically (e.g., person detection operations every 6 seconds and motion detection operations every frame). Upon detection of no persons or motion, the state can transition to S2. Upon detection of persons (a number N of persons detected >0), the state may transition to S1. A more detailed description of the functionalities performed during each state is provided herein in reference to FIGS. 6A-6E.

In an example, motion detection may be performed and an image frame may be acquired for person detection after motion is detected. Additionally, to further improve processing efficiency, person detection may be performed only within an area of the image corresponding to an area where the motion was detected.

Figure 6A:
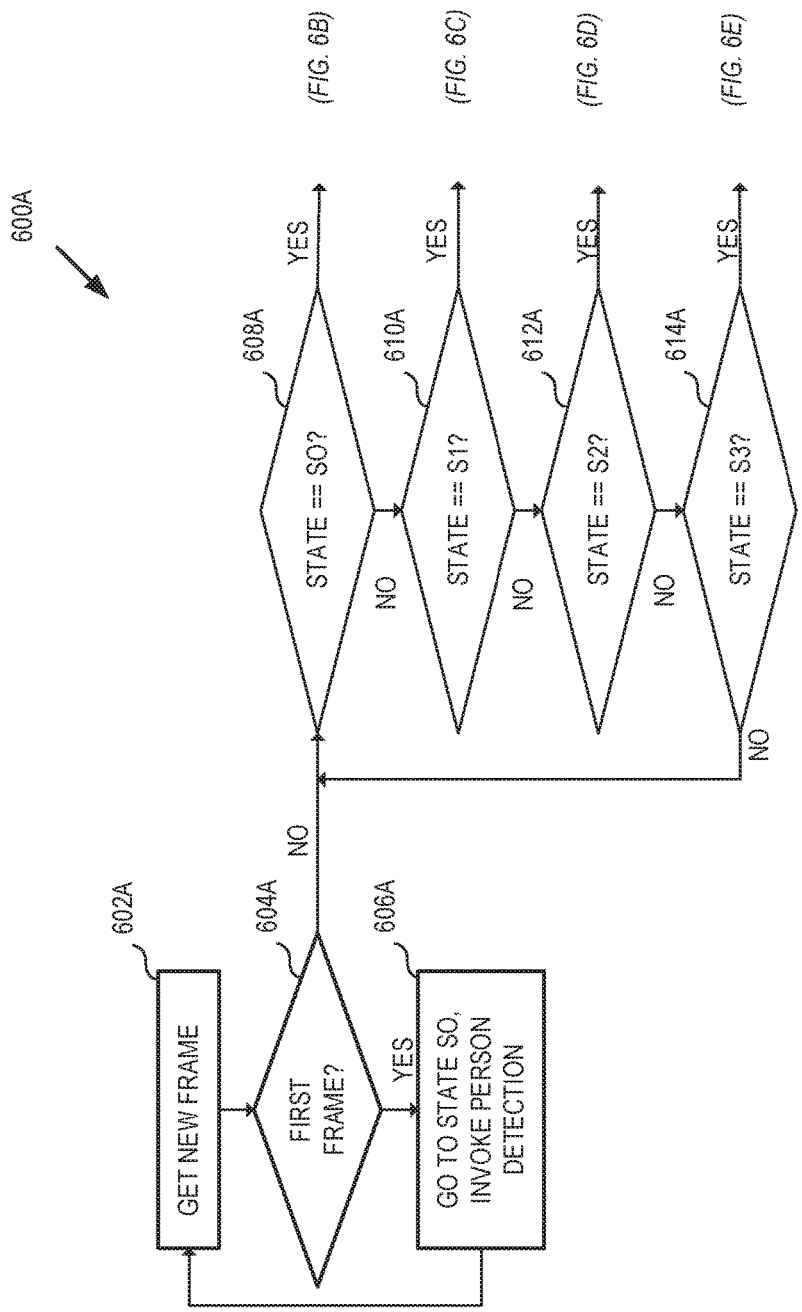
FIGS. 6A-6E illustrate flow diagrams of example processes associated with various states of the state machine of FIG. 5, in accordance with respective examples.
Figure 6B:
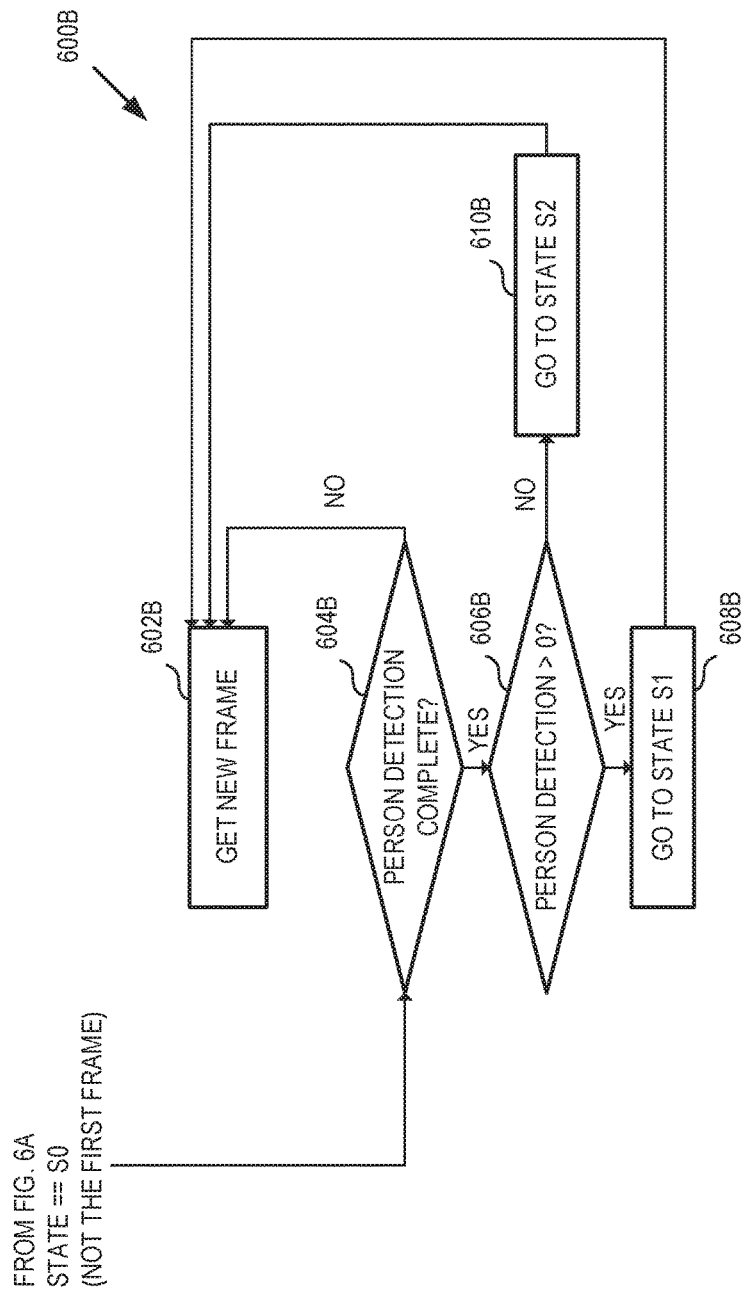
Figure 6C:
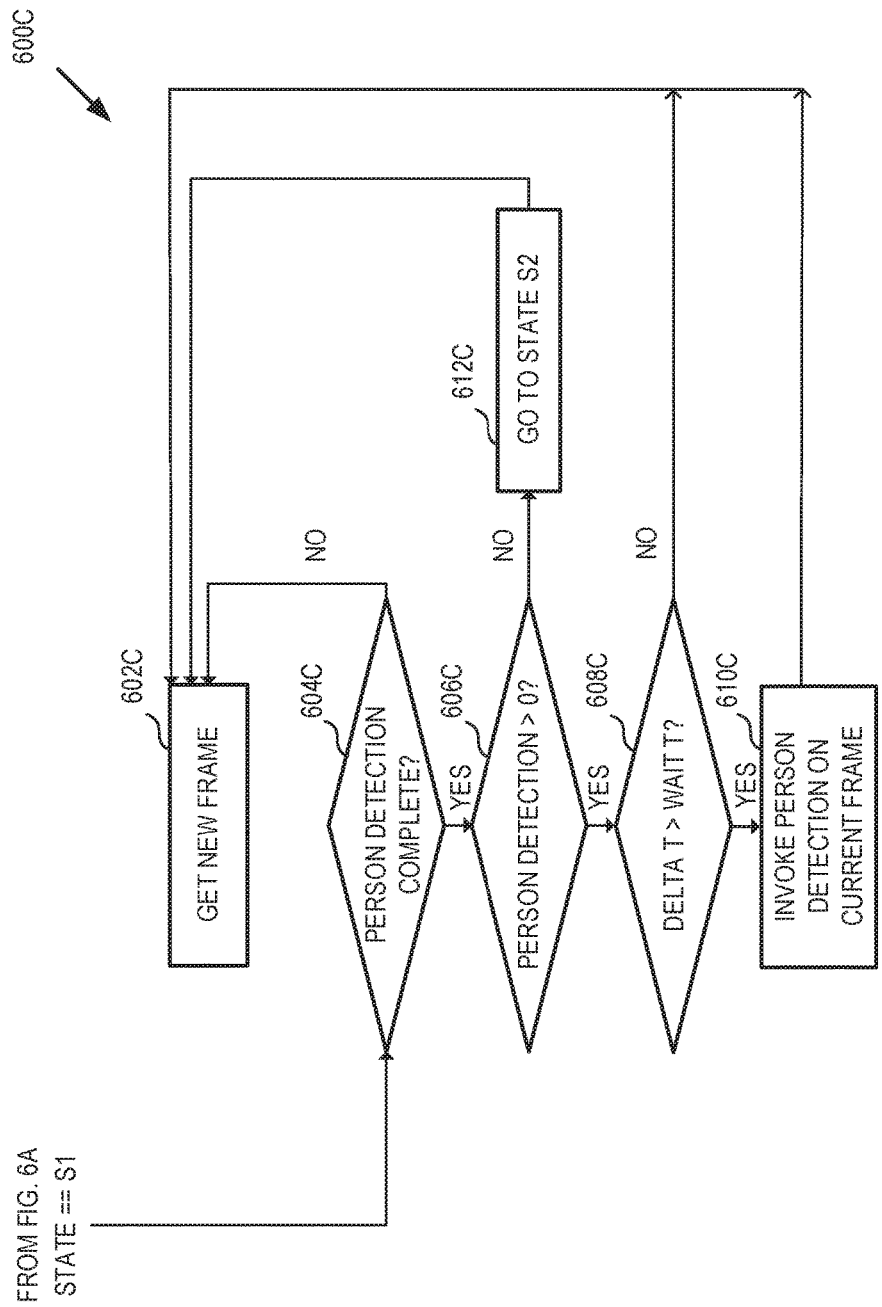
Figure 6D:
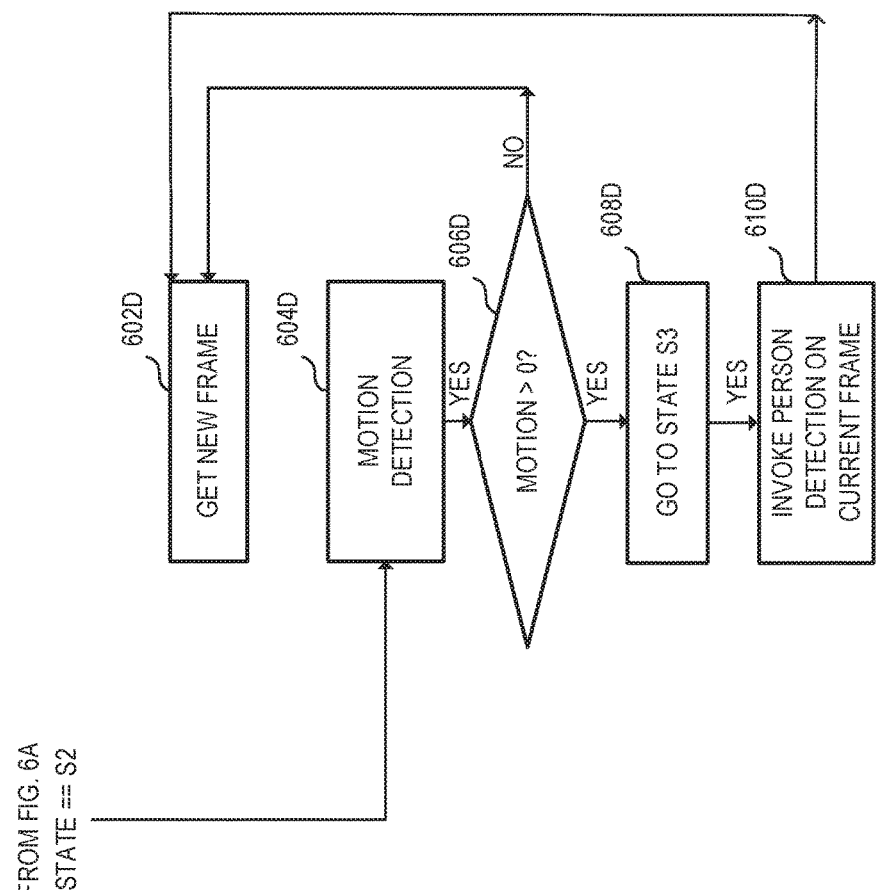
Figure 6E:
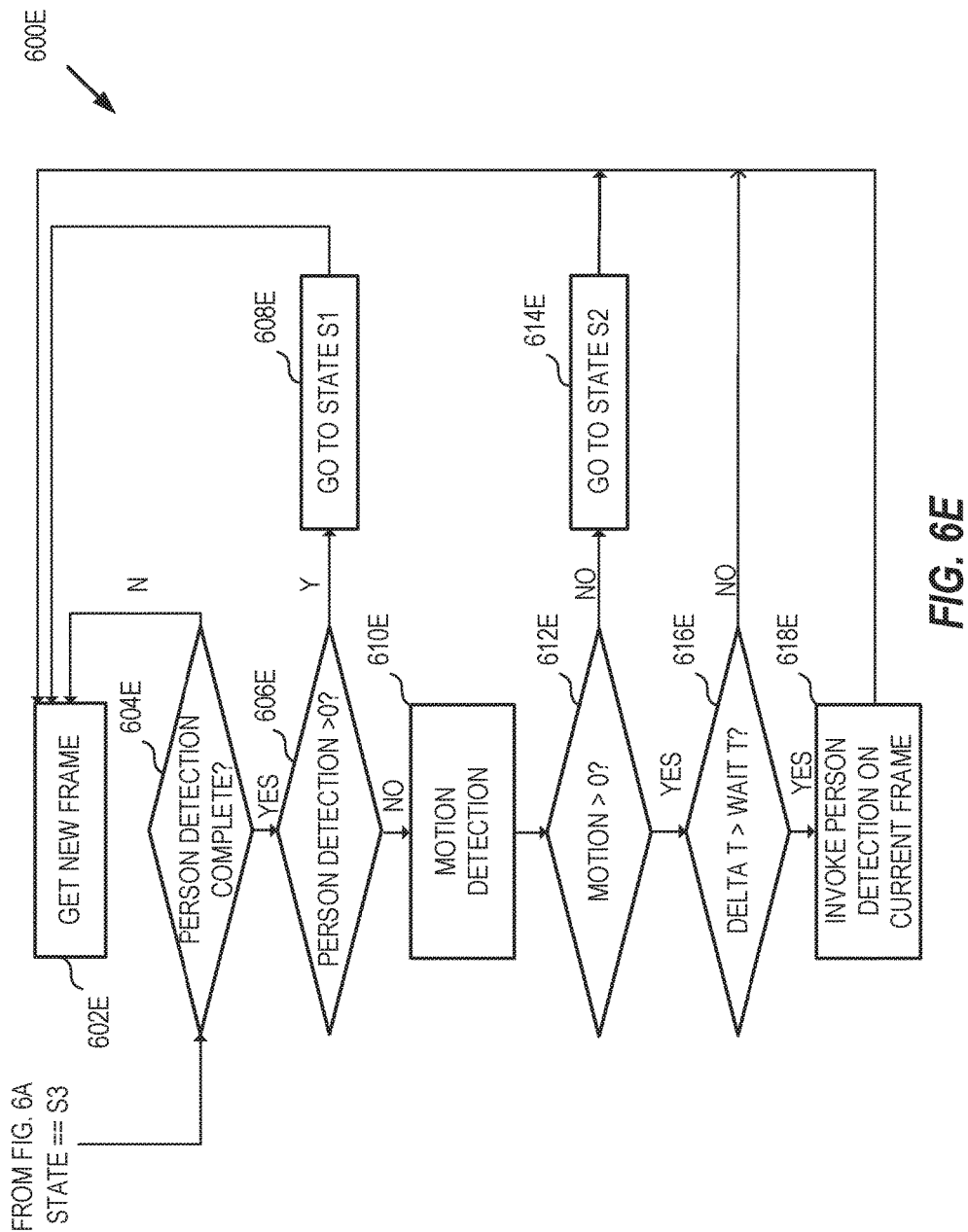

FIGS. 6A-6E illustrate flow diagrams of example processes associated with various states of the state machine of FIG. 5, in accordance with an example embodiment. Referring to FIG. 6A, the process 600A may start at 602A, when a new frame is obtained (e.g., by the image splitting and rearrangement functionality 222A). At 604A it may be determined whether the obtained frame is a first frame. If the obtained frame is the first frame, then processing continues at 606A, when person detection is performed (e.g., by the person detection functionality 224A and after the image has been processed by the image splitting and rearrangement functionality 222A as discussed in reference to FIGS. 3-4B).

If the obtained frame is not the first frame, then processing continues at 608A, when it is determined whether the person counting service 220A (or the person detection functionality 224B in particular) is in state S0. If the state S0 is active, then processing continues at process flow 600B in FIG. 6B. At 604B it may be determined whether person detection is completed. If it is not completed, then a new frame is obtained at 602B. If person detection is completed, at 606B, it may be determined whether persons have been detected (e.g., a number N of persons detected >0). If no persons have been detected, at 610B, the state may transition to S2 and a new frame is obtained at 602B. If one or more persons have been detected, at 608B, the state may transition to S1 and a new frame is obtained at 602B.

If at 608A it is determined that the state is not S0, then processing continues at 610A, where it may be determined whether the current state is S1. If the current state is S processing continues at process flow 600C in FIG. 6C. At 604C it may be determined whether person detection is completed. If it is not completed, then a new frame is obtained at 602C. If person detection is completed, at 606C, it may be determined whether persons have been detected (e.g., a number N of detected persons >0). If no persons have been detected, at 612C, the state may transition to S2 and a new frame is obtained at 602C. If persons have been detected, at 608C, it may be determined whether a timer T has been expired (e.g., 6 seconds). If the timer has not expired, a new frame is obtained at 602C. If the timer has expired, at 610C, person detection operations is invoked on the current frame and a new frame is obtained at 602C.

If at 610A it is determined that the state is not S1, then processing continues at 612A, where it may be determined whether the current state is S2. If the current state is S2, processing continues at process flow 600D in FIG. 6D. At 604D, motion detection may be performed. At 606D, it may be determined whether motion is detected. If motion is not detected, a new frame is obtained at 602D. If motion is detected, at 608D, the state may transition to S3. At 610D, person detection is invoked on the current frame, and a new frame is obtained at 602D.

If at 612A it is determined that the state is not S2, then processing continues at 614A, where it may be determined whether the current state is S3. If the current state is S3, processing continues at process flow 600E in FIG. 6E. At 604E it may be determined whether person detection is completed. If it is not completed, then a new frame is obtained at 602E. If person detection is completed, at 606E, it may be determined whether persons have been detected (e.g., the number N of detected persons >0). If persons have been detected, at 608E, the state may transition to S1 and a new frame is obtained at 602E. If persons have not been detected, at 610E, motion detection may be performed. At 612E, it may be determined whether motion is detected. If motion is not detected, the state transitions to S2 and a new frame is obtained at 602E. If motion is detected, at 616E, it may be determined whether a timer T has been expired (e.g., 6 seconds). If the timer has not expired, a new frame is obtained at 602E. If the timer has expired, at 618E, person detection is invoked on the current frame and a new frame is obtained at 602E.

Figure 7:
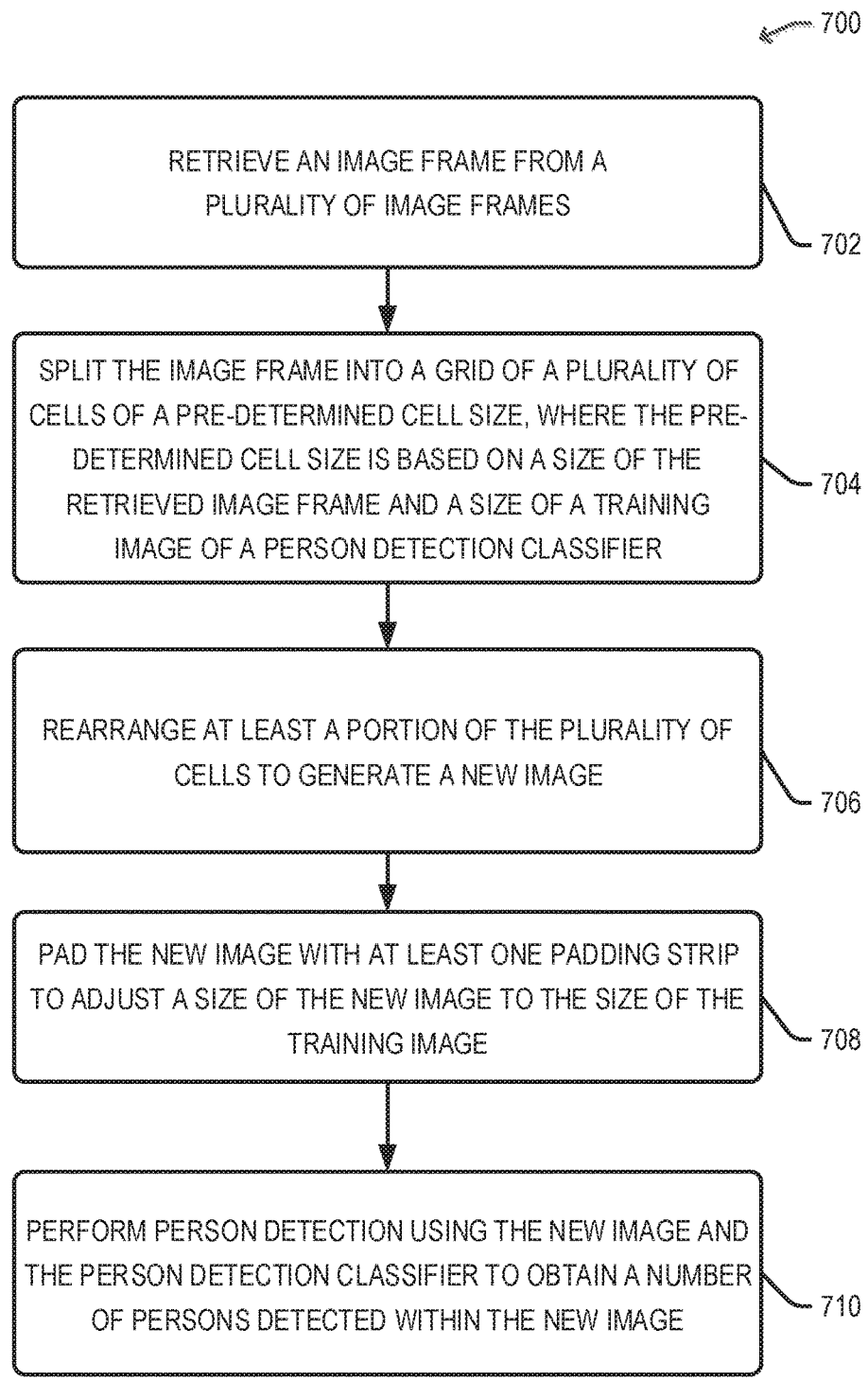
FIGS. 7-9 illustrate flow diagrams of example processes for person counting, in accordance with an example.
Figure 8:
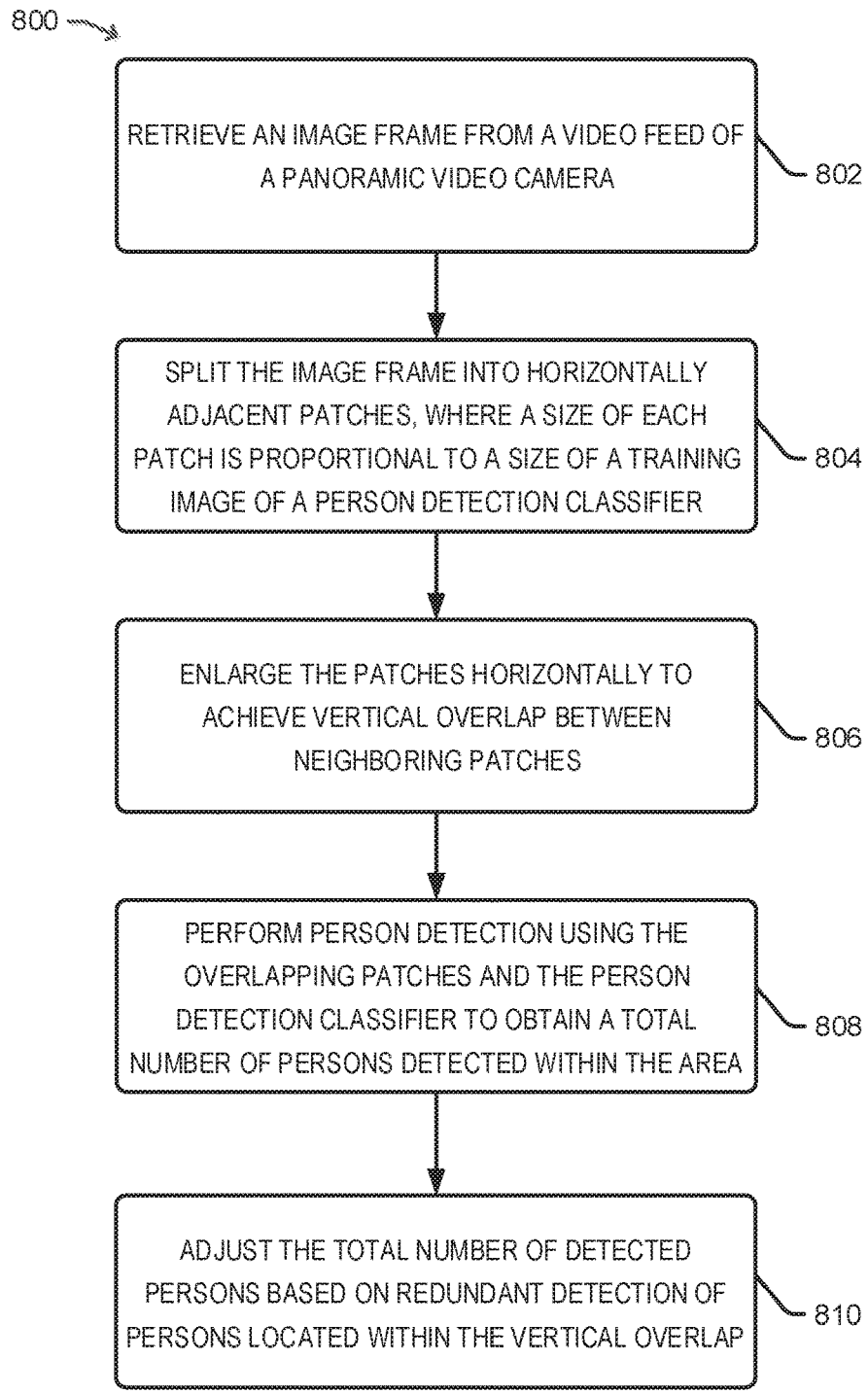
Figure 9:
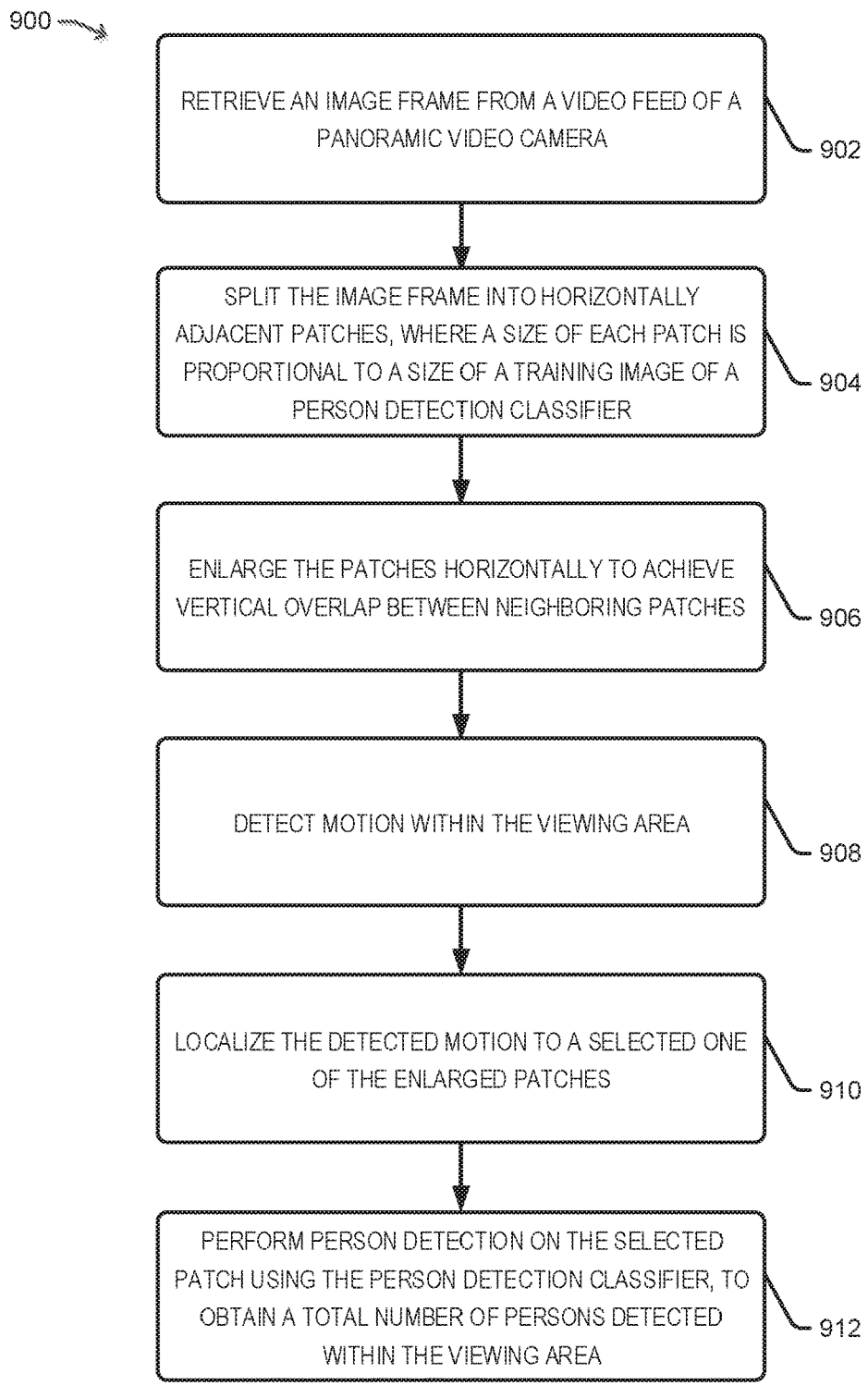

FIGS. 7-9 illustrate flow diagrams of example processes for person counting, in accordance with example embodiments. Referring to FIG. 7, the example method 700 may start at 702, when an image frame is retrieved from a plurality of image frames. For example and in reference to FIGS. 1-2, video feed from camera 219A may be stored in storage 204A. The person counting service 220A may retrieve an image frame from the storage 204A. At 704, the image frame may be split into a grid of a plurality of cells of a pre-determined cell size. For example and as illustrated in FIG. 4A, the image frame 400 is split into a plurality of patches (or cells) 402-408. The pre-determined cell size may be based on a size of the retrieved image frame and a reference size of training images of a person detection classifier (e.g., dimensions of the training image 314). At 706, at least a portion of the plurality of cells can be rearranged to generate a new image. For example, two of the patches (e.g., 402 and 406) may be rearranged to form a new image with a size that can be approximately equal to (e.g., width and/or height of new image are within a pre-determined threshold from the corresponding width and height of the training image). The rearrangement of patches 402 and 406 may be similar to the rearrangement of patches 304 and 306 in FIG. 3. At 708, the new image may be padded with at least one padding strip to adjust a size of the new image to the reference size of the training image. For example, a horizontal and/or vertical padding strips (e.g., 312, 310) may be added along a border between the two patches or along a side of the new image. At 710, person detection may be performed using the new image and the person detection classifier to obtain a number of persons detected within the new image.

Referring to FIG. 8, the example method 800 may start at 802, when an image frame from a video teed of a panoramic video camera is retrieved. For example and in reference to FIGS. 1-2, video feed from camera 219A may be stored in storage 204A. The person counting service 220A may retrieve an image frame from the storage 204A. At 804, the image frame may be split into horizontally adjacent patches. For example and as seen in FIG. 3, the image frame 302 may be split into horizontally adjacent patches 304 and 306. A size of each patch may be proportional to a size of a training image (e.g., 314) of a person detection classifier. At 806, the patches may be enlarged horizontally to achieve vertical overlap between neighboring patches (e.g., adding overlap ON as seen in FIG. 4A). At 808, person detection may be performed using the overlapping patches and the person detection classifier to obtain a total number of persons detected within the area. At 810, the total number of persons detected may be adjusted based on redundant detection of persons located within the vertical overlap. For example, redundant detection (e.g., 446) may be performed to detect redundant bounding boxes (e.g., 436) that overlap within an overlap area.

Referring to FIG. 9, the example method 900 may start at 902, when an image frame is retrieved from a video feed of a panoramic video camera. For example and in reference to FIGS. 1-2, video feed from camera 219A may be stored in storage 204A. The person counting service 220A may retrieve an image frame from the storage 204A. At 904, the image frame may be split into horizontally adjacent patches. For example and as seen in FIG. 3, the image frame 302 may be split into horizontally adjacent patches 304 and 306. A size of each patch may be proportional to a size of a training image (e.g., 314) of a person detection classifier. At 906, the patches may enlarged horizontally to achieve vertical overlap between neighboring patches (e.g., adding overlap OL1 as seen in FIG. 4A). At 908, motion may be detected within the viewing area. For example, motion detection functionality 226 may be used to detect the motion. At 910, the detected motion may be localized to a selected one of the enlarged patches. For example and in reference to FIG. 4A, the motion may be localized within the area of patch 410. At 912, person detection may be performed on the selected patch using the person detection classifier, to obtain a total number of persons detected within the viewing area. For example, only patch 410 may be communicated to the person detection functionality 224A for further processing.

Figure 10:
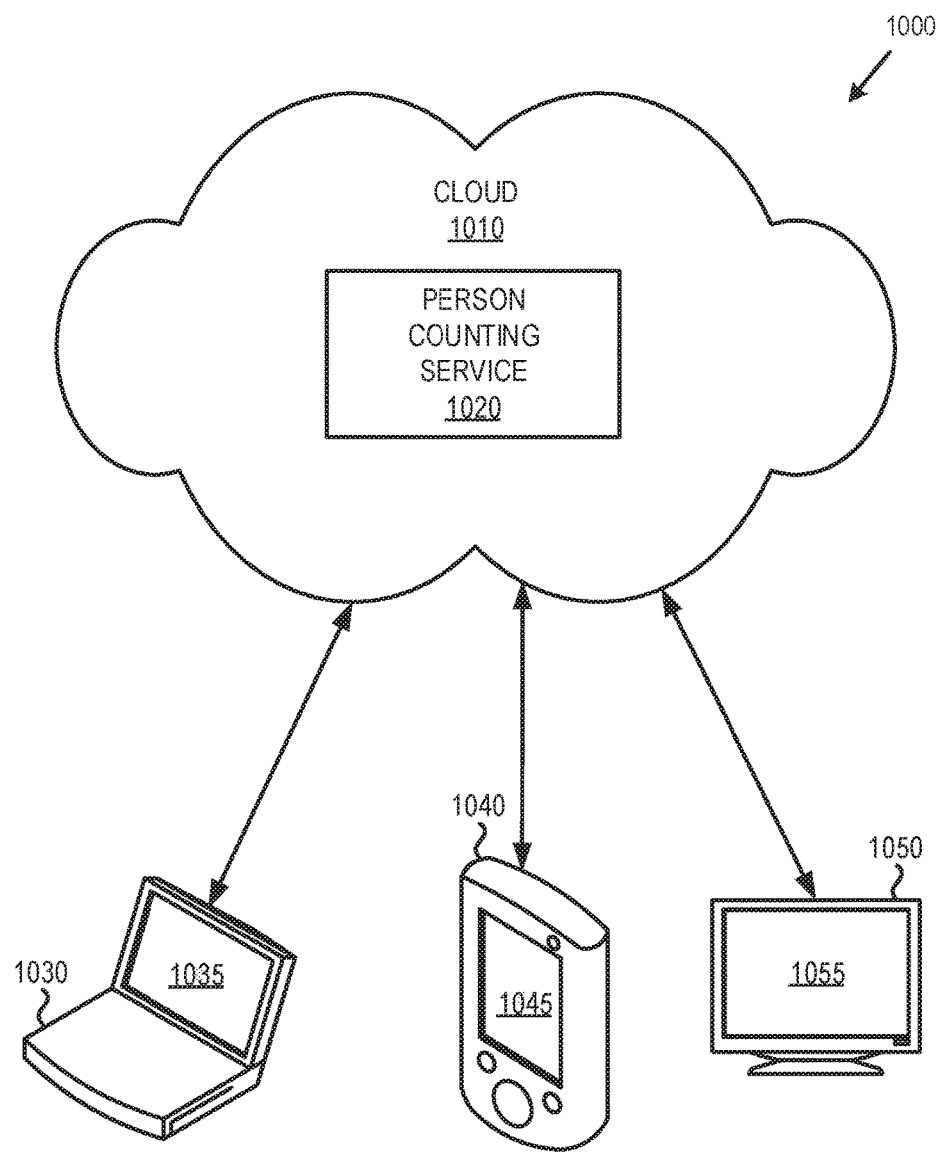
FIG. 10 illustrates a generalized example of a suitable cloud-supported environment, in which described embodiments, techniques, and technologies may be implemented.

FIG. 10 illustrates a generalized example of a suitable cloud-supported environment 1000, in which described embodiments, techniques, and technologies may be implemented. In the example environment 1000, various types of services (e.g., computing services) are provided by a cloud 1010. For example, the cloud 1010 can include a collection of centrally-located or distributed computing devices that provide cloud-based services to various types of users and devices connected via a network, such as the Internet. The cloud-supported environment 1000 can be used in different ways to accomplish computing tasks. For example, some tasks (e.g., processing user input and presenting a user interface) can be performed on local computing devices (e.g., connected devices 1030, 1040, 1050), while other tasks (e.g., storage of data to be used in subsequent processing, performing of computational and analytical tasks, and so forth) can be performed in the cloud 1010.

In example environment 1000, the cloud 1010 provides services for connected devices 1030, 1040, 1050 with a variety of computing and display capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like.

One or more of the connected devices 1030, 1040, and/or 1050 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services related to person counting can be provided by the cloud 1010 through the person counting service 1020. The service 1020 may have functionalities similar to the person counting service 220, and may include functionalities such as image splitting and rearrangement (222), person detection (224) and motion detection (226) as described herein. Additionally, the person counting service 1020 may be used for storing person counting data for various locations (e.g., offices) associated with customer accounts (e.g., customers who subscribe to the service 1020), generating and providing occupancy statistical patterns, and other functionalities related to person counting.

In the example environment 1000, the cloud 1010 provides one or more of the technologies and solutions described herein to various connected devices (such as 1030, 1040, and/or 1050) using, at least in part, the person counting service 1020.

Figure 11:
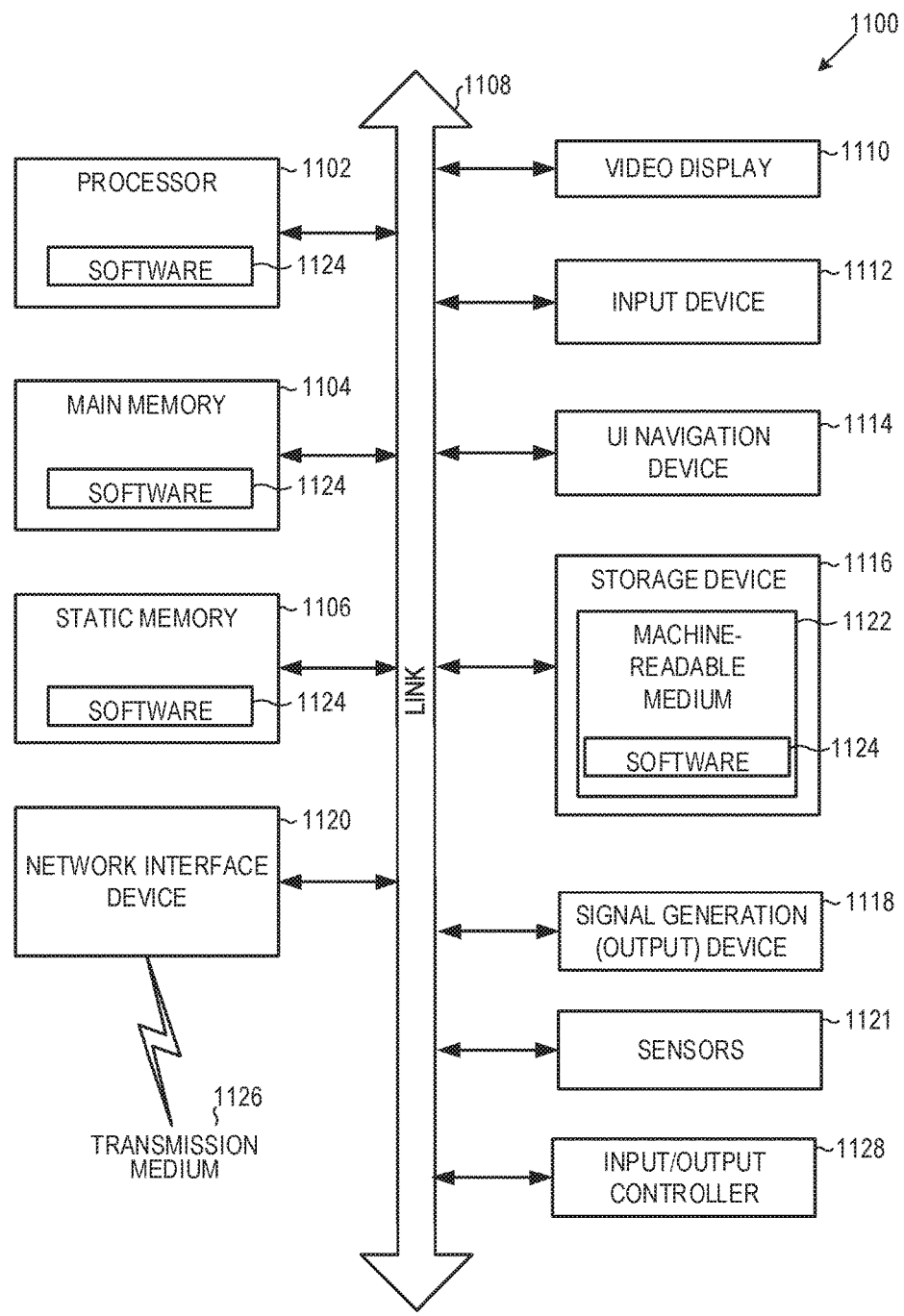
FIG. 11 is an example computing device that can be used in conjunction with the technologies described herein.

FIG. 11 is an example computing device that can be used in conjunction with the technologies described herein. In alternative embodiments, the computing device 1100 may operate as a standalone device or may be connected (e.g., networked) to other computing devices. In a networked deployment, the computing device 1100 may operate in the capacity of a server communication device, a client communication device, or both in server-client network environments. In an example, the computing device 1100 may act as a peer computing device in peer-to-peer (P2P) (or other distributed) network environment. The computing device 1100 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations.

Computing device 1100 may include a hardware processor 1102 (e.g., a central processing unit (CPU), a graphics processing unit (CPU), a hardware processor core, or any combination thereof), a main memory 1104 and a static memory 1106, some or all of which may communicate with each other via an interlink (e.g., bus) 1108. The computing device 1100 may further include a display unit 1110, an input device 1112 (e.g., a keyboard), and a user interface (UI) navigation device 1114 (e.g., a mouse). In an example, the display unit 1110, input device 1112, and UI navigation device 1114 may be a touch screen display. In an example, the input device 1112 may include a touchscreen, a microphone, a camera (e.g., a panoramic or high-resolution camera), physical keyboard, trackball, or other input devices.

The computing device 1100 may additionally include a storage device (e.g., drive unit) 1116, a signal generation device 1118 (e.g., a speaker, a projection device, or any other type of information output device), a network interface device 1120, and one or more sensors 1121, such as a global positioning system (GPS) sensor, compass, accelerometer, motion detector, or other sensor. The computing device 1100 may include an input/output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 1116 may include a computing device (or machine) readable medium 112:2, on which is stored one or more sets of data structures or instructions 1124 (e.g., software) embodying or utilized by any one or more of the techniques or functions described herein. In an example, at least a portion of the software may include an operating system and/or one or more applications (or apps) implementing one or more of the functionalities described herein. The instructions 11:24 may also reside, completely or at least partially, within the main memory 1104, within the static memory 1106, and/or within the hardware processor 1102 during execution thereof by the computing device 1100. In an example, one or any combination of the hardware processor 1102, the main memory 1104, the static memory 1106, or the storage device 1116 may constitute computing device (or machine) readable media.

While the computing device readable medium 1122 is illustrated as a single medium, a "computing device readable medium" or "machine-readable medium" may include a single medium or multiple media (e.g., a centralized or distributed database, and/or associated caches and servers) configured to store the one or more instructions 1124.

In an example, a computing device readable medium or machine-readable medium may include any medium that is capable of storing, encoding, or carrying instructions for execution by the computing device 1100 and that cause the computing device. 1100 to perform any one or more of the techniques of the present disclosure, or that is capable of storing, encoding or carrying data structures used by or associated with such instructions. Non-limiting computing device readable medium examples may include solid-state memories, and optical and magnetic media. Specific examples of computing device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. In some examples, computing device readable media may include non-transitory computing device readable media. In some examples, computing device readable media may include computing device readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®), IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1120 may include one or more physical jacks (e.g., Ethernet, coaxial, or phone jacks) or one or more antennas to connect to the communications network 1126. In an example, the network interface device 1120 may include one or more wireless modems, such as a Bluetooth modem, a Wi-Fi modem or one or more modems or transceivers operating under any of the communication standards mentioned herein. In an example, the network interface device 1120 may include a plurality of antennas to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques. In an example, a transmission medium may include any intangible medium that is capable of storing, encoding or carrying instructions for execution by the computing device 1100, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system, comprising:
    a processing unit;
    a camera; and
    a memory storing a plurality of image frames from a video feed of the camera;
    the system configured to perform operations for processing video data, the operations comprising:
        retrieving an image frame from the plurality of image frames;
        splitting the image frame into a grid of a plurality of cells having pre-determined cell dimensions, wherein the pre-determined cell dimensions are based on dimensions of the retrieved image frame and reference dimensions of a training image of a person detection classifier;
        rearranging at least a portion of the plurality of cells to generate a new image;
        padding the new image with at least one padding strip to adjust dimensions of the new image based on the reference dimensions of the training image; and
        performing person detection using the new image and the person detection classifier to obtain a number of persons detected within the new image.

2. The system of claim 1, wherein the image frame is a high-resolution image frame and the operations further comprise:
    generating the at least one new image without scaling image data in the retrieved image frame.

3. The system of claim 1, wherein the operations further comprise:
    rearranging a remaining portion of the plurality of cells to generate a second new image, wherein each of the plurality of cells is used once to generate the new image or the second new image; and
    performing person detection using the at least second new image and the person detection classifier to obtain at least a second number of persons detected within the at least second new image.

4. The system of claim 1, wherein the operations further comprise:
    enlarging each of the plurality of cells to achieve an overlap region between neighboring cells.

5. The system of claim 4, wherein the overlap region comprises a vertical overlap between horizontally adjacent cells and a horizontal overlap between vertically adjacent cells.

6. The system of claim 5, wherein the operations further comprise:
    determining dimensions of the overlap region based on the reference dimensions of the training image.

7. The system of claim 4, wherein the operations further comprise:
    generating a bounding box for each person detected within the new image.

8. The system of claim 7, wherein the operations further comprise:
    adjusting the number of persons to account for redundant detection, when at least two of the bounding boxes partially overlap and are located within the overlap region.

9. The system of claim 7, wherein the operations further comprise:
adjusting the number of persons to account for erroneous detection, when at least one of the bounding boxes is located within the at least one padding strip.

10. The system of claim 1, wherein the retrieved image frame is a panoramic image frame of an area, and wherein the operations further comprise:
vertically splitting the panoramic image frame into a plurality of horizontally adjacent patches, wherein the dimensions of each patch are smaller than the reference dimensions of the training image.

11. The system of claim 10, wherein the operations further comprise:
adjusting the dimensions of each patch based on the reference dimensions of the training image; and
performing the person detection on each of the adjusted patches to obtain a total number of persons detected within the area.

12. The system of claim 11, wherein the adjusting further comprises at least one of:
enlarging the patches horizontally to achieve vertical overlap between neighboring patches;
adding horizontal black padding strips; or
adding vertical black padding strips;
wherein the total number of persons is adjusted for erroneous and redundant detection.

13. A method, performed by a computing device, for person counting within an area, the method comprising:
retrieving an image frame from a video feed of a panoramic video camera;
splitting the image frame into horizontally adjacent patches, wherein dimensions of each patch are proportional to reference dimensions of training images of a person detection classifier;
enlarging the patches horizontally to achieve vertical overlap between neighboring patches;
performing person detection using the overlapping patches and the person detection classifier to obtain a total number of persons detected within the area; and
adjusting the total number of persons detected based on redundant detection of persons located within the vertical overlap.

14. The method of claim 13, further comprising:
selecting a width of each patch based on a width of the reference dimensions;
generating a minimal number of horizontally adjacent patches after the splitting of the image frame into the horizontally adjacent patches.

15. The method of claim 13, wherein a width of the overlap is based on height and width of the reference dimensions.

16. The method of claim 13, further comprising:
rearranging at least two of the horizontally adjacent patches to generate a new image;
padding the new image with at least one padding strip to adjust the dimensions of the new image to the reference dimensions of the training images; and
performing the person detection by applying the person detection classifier to the new image.

17. The method of claim 16, further comprising:
generating a bounding box for each of the detected persons within the new image; and
adjusting the total number of persons detected to account for erroneous detection, in response to at least one of the bounding boxes being located within the at least one padding strip.

18. The method of claim 13, further comprising:
performing motion detection within the area; and
performing the person detection upon detecting motion within the area.

19. A non-transitory computer-readable storage medium storing computer-executable instructions that, when executed by a computing device, cause the computing device to perform a method for person counting within a viewing area of a camera, with operations that:
retrieve an image frame from a video feed of a panoramic video camera;
split the image frame into horizontally adjacent patches, wherein the dimensions of each patch are proportional to the reference dimensions of training images of a person detection classifier;
enlarge the patches horizontally to achieve vertical overlap between neighboring patches;
detect motion within the viewing area;
localize the detected motion to a selected patch of the enlarged patches; and
perform person detection on the selected patch using the person detection classifier, to obtain a total number of persons detected within the viewing area.

20. The computer-readable storage medium of claim 19, wherein the detected motion is localized to at least two of the patches, and wherein the operations further:
rearrange the at least two patches to generate a new image;
pad the new image with at least one padding strip to adjust the dimensions of the new image to the reference dimensions of the training images; and
perform the person detection by application of the person detection classifier to the new image.

* * * * *